(12) United States Patent
Shiraishi et al.

(10) Patent No.: US 11,214,299 B2
(45) Date of Patent: Jan. 4, 2022

(54) AUTOMATIC STEERING CONTROL DEVICE FOR VEHICLE

(71) Applicant: SUBARU CORPORATION, Tokyo (JP)

(72) Inventors: Eiichi Shiraishi, Tokyo (JP); Satoru Akiyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 174 days.

(21) Appl. No.: 16/589,892

(22) Filed: Oct. 1, 2019

(65) Prior Publication Data

US 2020/0156700 A1 May 21, 2020

(30) Foreign Application Priority Data

Nov. 15, 2018 (JP) .............................. JP2018-214667

(51) Int. Cl.
*B62D 6/00* (2006.01)
*B62D 15/02* (2006.01)
*B62D 5/04* (2006.01)

(52) U.S. Cl.
CPC .............. *B62D 6/00* (2013.01); *B62D 5/0463* (2013.01); *B62D 15/021* (2013.01)

(58) Field of Classification Search
CPC .......... B62D 6/00; B62D 5/04; B62D 5/0463; B62D 15/02; B62D 15/021
See application file for complete search history.

(56) References Cited

U.S. PATENT DOCUMENTS

| 2002/0005314 | A1* | 1/2002 | Takehara | ............. | B62D 5/0466 180/443 |
| 2007/0294011 | A1* | 12/2007 | Yasui | .................... | B60T 8/1764 701/41 |
| 2008/0036296 | A1* | 2/2008 | Wu | .................... | B60W 50/0097 303/146 |
| 2008/0047775 | A1* | 2/2008 | Yamazaki | ............. | B62D 6/008 180/443 |
| 2009/0069979 | A1* | 3/2009 | Yamashita | ........... | B62D 5/0463 701/42 |

(Continued)

FOREIGN PATENT DOCUMENTS

JP        2014-013006 A        1/2014

*Primary Examiner* — Tan Q Nguyen
(74) *Attorney, Agent, or Firm* — McDermott Will & Emery LLP (57) ABSTRACT

An automatic steering control device for a vehicle includes: a steering angle change amount detector; a vehicle behavior detector; a disturbance determinator; and a counter torque applying processor. The steering angle change amount detector detects a steering angle change amount that acts on a steered wheel; the vehicle behavior detector detects a yaw change amount that acts on the vehicle; the disturbance determinator determines a disturbance that acts on the vehicle, based on the steering angle change amount and the yaw change amount; and the counter torque applying processor applies a counter torque for suppressing the yaw change amount on the electric power steering motor, when it is determined by the disturbance determinator that the steering angle change amount is within an allowable steering angle change range and the yaw change amount is outside an allowable yaw change range.

6 Claims, 6 Drawing Sheets

(56) References Cited

U.S. PATENT DOCUMENTS

| | | | | |
|---|---|---|---|---|
| 2011/0288716 | A1* | 11/2011 | Marur | B60G 17/021 |
| | | | | 701/31.4 |
| 2013/0320781 | A1* | 12/2013 | Hosaka | H02K 16/00 |
| | | | | 310/12.13 |
| 2014/0058630 | A1* | 2/2014 | Kezobo | B62D 5/0472 |
| | | | | 701/42 |
| 2015/0377215 | A1* | 12/2015 | Agarwal | F03D 7/0212 |
| | | | | 416/1 |
| 2017/0158238 | A1* | 6/2017 | Takaso | B62D 15/026 |

* cited by examiner

AUTOMATIC STEERING CONTROL DEVICE FOR VEHICLE

CROSS-REFERENCE TO RELATED APPLICATIONS

The present application claims priority from Japanese Patent Application No. 2018-214667 filed on Nov. 15, 2018, the entire contents of which are hereby incorporated by reference.

BACKGROUND

The technology relates to an automatic steering control device for a vehicle that, when detecting a disturbance during traveling by automatic driving, reduces the wobble of a vehicle by suppressing a behavior which affects the vehicle.

This type of automatic steering control is performed to make an own vehicle travel along a traveling lane and is adopted to automatic driving in which a driver sets a destination and driving on the entire or a part of a traveling route from the current position to the destination is automatically performed instead of a driver. In addition, the automatic steering control is adopted also to driving assistance in which even when a driver does not set a destination, Active Lane Keep (ALK) control for making an own vehicle travel straight along a lane is performed.

When an own vehicle is influenced by disturbances such as a rut or cross wind during traveling by the automatic steering control, yaw (yawing) may be generated in the own vehicle, causing a wobble of the own vehicle.

To deal with such a circumstance, for instance, Japanese Unexamined Patent Application Publication No. 2014-13006 discloses that in a case where an assist torque for assisting the steering wheel operation of a driver is generated by an electric power steering motor (hereinafter, referred to as "EPS motor"), when a steering angle is significantly changed due to a disturbance, the control gain of a steering angle feedback control system for improving assist responsiveness is reduced to reduce the assist torque, so as not to further increase the change in the steering angle, thereby allowing a wobble to be prevented.

SUMMARY OF THE INVENTION

An aspect of the technology is an automatic steering control device for a vehicle including an electric power steering motor. The automatic steering control device includes: a steering angle change amount detector configured to detect a steering angle change amount which acts on a steered wheel; a vehicle behavior detector configured to detect a yaw change amount which acts on the vehicle; a disturbance determinator configured to determine a disturbance which acts on the vehicle, based on the steering angle change amount detected by the steering angle change amount detector and the yaw change amount detected by the vehicle behavior detector; and a counter torque applying processor configured to apply a counter torque for suppressing the yaw change amount on the electric power steering motor, when it is determined by the disturbance determinator that the steering angle change amount is within an allowable steering angle change range and the yaw change amount is outside an allowable yaw change range.

Another aspect of the technology is an automatic steering control device for a vehicle using an electric power steering motor. The automatic steering control device includes: circuitry configured to detect a steering angle change amount which acts on a steered wheel; circuitry configured to detect a yaw change amount which acts on the vehicle; circuitry configured to determine a disturbance which acts on the vehicle, based on the steering angle change amount and the yaw change amount; and circuitry configured to, when it is determined by the circuit configured to determine a disturbance that the steering angle change amount is within an allowable steering angle change range and the yaw change amount is outside an allowable yaw change range, apply a counter torque for suppressing the yaw change amount on the electric power steering motor.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

A description is given below of some embodiments of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale.

In automatic steering control, basically, an output from an EPS motor serves as a torque (motor torque) for steering operation. Therefore, when yaw is generated in the vehicle due to the influence of a disturbance, reducing a control gain causes a steering torque to be reduced and this further increases the wobble of the vehicle.

Accordingly, in the automatic steering control, when yaw is generated in the vehicle due to a disturbance, a wobble of the vehicle cannot be prevented even by performing control to suppress an assist torque by changing a gain of a steering angle feedback control system for improving assist responsiveness.

In addition, a disturbance received by steered wheels (front wheels) may be an undulation such as a step height. In this case, the operation of the steered wheels from getting on to getting over the undulation causes the toe angle of the steered wheels to be changed according to a change in a suspension stroke. That is, so-called bump steer occurs. A change in the toe angle due to the bump steer substantially becomes a change in a steering angle and therefore, a wobble of the vehicle may be generated also in this case.

It is desirable to provide an automatic steering control device that can obtain excellent traveling performance by suppressing the wobble of a vehicle even in a situation where yaw is easily generated due to a disturbance to the vehicle during traveling by the automatic steering control.

Figure 1:
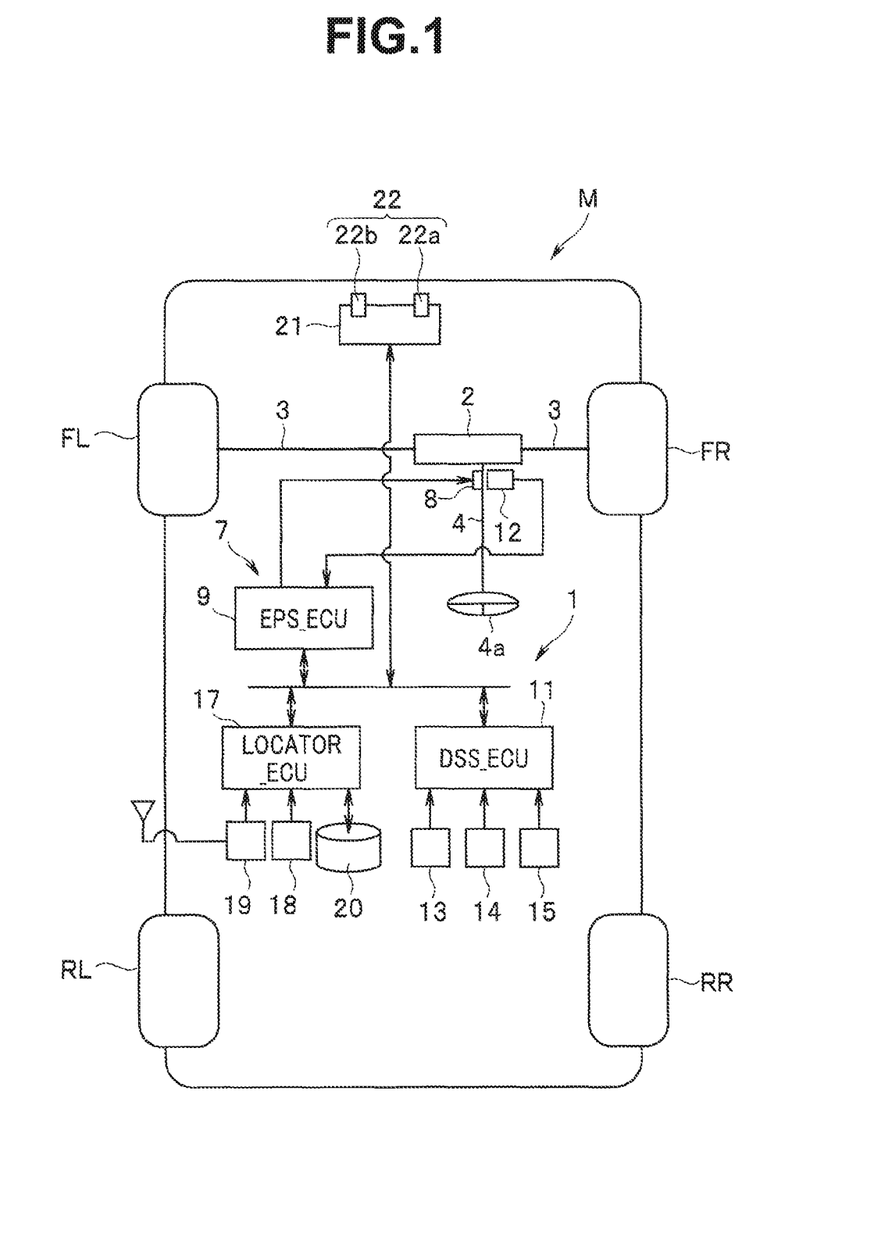
FIG. 1 is a schematic block diagram of a vehicle equipped with a steering control device.

One example of the technology will be described below based on drawings. In FIG. 1, reference sign 1 indicates the automatic steering control device which is mounted on an own vehicle M. The own vehicle M has front left and right wheels FL and FR and rear left and right wheels RL and RR. This front left and right wheels FL and FR are steered wheels and are coupled to a steering mechanism 2 such as a rack and pinion mechanism via a tie rod 3. Further, to this steering mechanism 2, a steering shaft 4 including a steering wheel 4a fixed at its tip end is coupled. When a driver operates the steering wheel 4a, the front wheels FL and FR are turned via the steering mechanism 2.

An electric power steering (EPS) motor 8 is coupled to the steering shaft 4 at a portion close to the steering mechanism 2.

The EPS motor 8 is controlled for steering by an automatic steering control device 1. The automatic steering control device 1 includes an EPS device 7 coupled to the EPS motor 8 via a transmission mechanism not illustrated. The EPS device 7 includes the EPS motor 8, an EPS control unit (EPS_ECU) 9, and a rotation angle sensor 12. The EPS_ECU 9 controls the torque (motor torque) applied on the steering shaft 4 by the EPS motor 8 and the rotation angle (steering angle) of the steering shaft 4.

The automatic steering control device 1 includes the EPS_ECU 9 described above, a DSS control unit (DSS_ECU) 11 for Driving Support System (DSS), and a locator device (Locator_ECU) 17, that are bidirectionally communicably connected via an in-vehicle network using CAN (Controller Area Network) communication, or the like.

The DSS_ECU 11 is coupled with sensors for detecting behaviors that acts on the own vehicle M as various parameters required for performing automatic steering control. The sensors include: a yaw rate sensor 13 for detecting a yaw rate that acts on the own vehicle M; and a vehicle speed sensor 14 for detecting the vehicle speed (own vehicle speed) of the own vehicle M. In addition, an automatic driving switch 15 is coupled to the DSS_ECU 11.

When the DSS_ECU 11 is in an inactive state (the automatic driving switch 15 is OFF), the automatic steering control is stopped and a manual driving is performed in which the driver her/himself grips the steering wheel 4a for steering operation. In this case, current control is performed in the EPS_ECU 9, and the driver sets an assist torque for assisting a steering torque to be applied to the steering wheel 4a.

On the other hand, when the DSS_ECU 11 is in an active state (the automatic driving switch 15 is ON), a rotation angle control is performed. In the rotation angle control, an actual rotation angle θmr detected by the rotation angle sensor 12 is read and the steering shaft 4 is rotated until the actual rotation angle θmr reaches an indicated rotation angle θms corresponding to a target steering angle which is set in the DSS_ECU 11. Thus, in the automatic steering control, a steering control is performed by the rotation angle control of the EPS_ECU 9 so that the own vehicle M travels while tracing a target traveling route described later (for instance, the center of the lane).

The Locator_ECU 17 is coupled with a route information input unit 18 to which an operator (mainly, a driver) inputs a destination and a waypoint, and a GNSS (Global Navigation Satellite System) receiver 19 for receiving position information from a plurality of positioning satellites. In addition, a road map database 20 including high-precision road map (dynamic map) data is coupled to this Locator_ECU 17. This road map database 20 is stored in a large-capacity storage medium such as a hard disk. The high-precision road map data has a layered structure in which dynamically changing information, such as traffic regulations, accidents, congestion, vehicles, pedestrians, signals, etc., on each road, is overlaid on static map data such as the shapes of roads and buildings, lane information, etc. The dynamic information is successively updated according to a change in a surrounding environment.

In the above-mentioned in-vehicle network, in addition to the EPS_ECU 9, DSS_ECU 11 and Locator_ECU 17, units for controlling the traveling state in a drive assist control including the automatic driving of the own vehicle M, which are not illustrated, are mutually communicably connected. The units include: a drive source control unit for controlling the output of a drive source typified by an engine and a motor; and a device for a vehicle steering stability control (VDC—Vehicle Dynamics Control) including a brake control. Each of those control units is mainly constituted of a microcomputer.

On the other hand, reference sign 21 indicates a traveling environment recognition device for obtaining information on traveling environment in front of the own vehicle M. The device is mainly constituted of a microcomputer and is provided with an on-vehicle camera 22 which is a stereo camera including a main camera 22a and a sub camera 22b.

The traveling environment recognition device 21 performs image processing for a forward traveling environment information image which has been picked up by the on-vehicle camera 22, and for instance, in a lane keeping control in automatic driving, recognizes partition lines for indicating the left border and the right border of the traveling lane and generates image information required for making the own vehicle M travel along the center of the lane. Note that the traveling environment recognition device 21 may adopt a millimeter-wave radar, an infrared laser radar, or the like instead of the stereo camera, as long as the device can obtain forward traveling environment information such as partition lines, etc. Alternatively, it may be possible to adopt the radars in combination with a monocular camera.

When the operator inputs a destination and, if necessary, a waypoint by operating the route information input unit 18, the Locator_ECU 17 establishes, on the road map, a traveling route for connecting an own vehicle position, which is set based on the positional information received by a GNSS receiver 19, to the destination and the waypoint which is input as required.

The DSS_ECU 11 performs a steering control by automatic driving so as to make the own vehicle M travel along the traveling route to the destination which is set on the road map. At the same time, the DSS_ECU 11 recognizes the left and right partition lines for partitioning the traveling lane based on the traveling environment information which is obtained by the traveling environment recognition device 21, and performs a lane keeping (ALK: Active Lane Keep) control so as to make the own vehicle M travel on the center between the left and right partition lines. In addition, when the automatic driving switch 15 is turned ON but destination information is not input to the Locator_ECU 17 from the route information input unit 18, the DSS_ECU 11 performs driving assist by the ALK control.

In the ALK control, a steering control is performed by controlling the rotation angle of the EPS motor 8. More specifically, in a driving assist control including automatic driving, the DSS_ECU 11 first sets a basic rotation angle for the EPS motor 8 for making the own vehicle M travel along a road shape, based on the road map data, or a road shape (road curvature) obtained from the traveling environment recognition device 21, a vehicle speed detected by the vehicle speed sensor 14, a yaw rate detected by the yaw rate sensor 13, etc. Then, the DSS_ECU 11 determines a feed forward control amount corresponding to the basic rotation angle.

In addition, the DSS_ECU 11 determines a deviation between the center of the own vehicle M in the vehicle width direction and the center of the lane based on the traveling environment information obtained by the traveling environment recognition device 21, and calculates a feedback control amount for converging the center of the own vehicle M in the vehicle width direction to the center of the lane. Then, the DSS_ECU 11 corrects the above-mentioned feed forward control amount with the feedback control amount, to determine an indicated rotation angle θms that is a motor control amount for driving the EPS motor 8.

The feedback control amount is set by a value obtained by adding a proportional term (P-component), an integration term (I-component), and a differential term (D-component) which are set according to a deviation between the center of the own vehicle M in the vehicle width direction and the center of the lane, and a PID control is performed with the set value. In addition, each term (P-component, I-component, D-component) is multiplied by a predetermined PID constant (P-gain, I-gain, D-gain) so as to obtain predetermined responsiveness. The optimal value of the PID constant (P-gain, I-gain, D-gain) differs according to the model of the own vehicle M, the characteristics of the EPS motor 8 mounted on the own vehicle M, etc. Therefore, the optimal value is set by a cut and try, auto-tuning method, etc.

The EPS_ECU 9 reads the indicated rotation angle θms of the EPS motor 8, which is set by the DSS_ECU 11, and rotates the EPS motor 8 until the actual rotation angle θmr detected by the rotation angle sensor 12 reaches the indicated rotation angle θms. Thus, a steering control for making the own vehicle M travel along the road shape is performed.

If the own vehicle M under traveling generates yaw under the influence of a disturbance such as a rut formed on a traveling path, cross wind, or the like, the vehicle may wobble. In addition, when at least one of the left or right front wheels FL and FR goes over an undulation such as a step difference, yaw is generated in the own vehicle M due to bump steer. A disturbance due to a rut or cross wind influences the steering angle of the own vehicle M, thereby causing a wobble. Therefore, setting the PID constant to a higher value (increasing the gain) can suppress the unexpected generation of yaw (wobble).

On the other hand, since the bump steer is caused not by the movement of the steering mechanism 2 but by the movement of a suspension link, the bump steer cannot be suppressed even when the PID constant is set to a higher value.

Figure 4A:
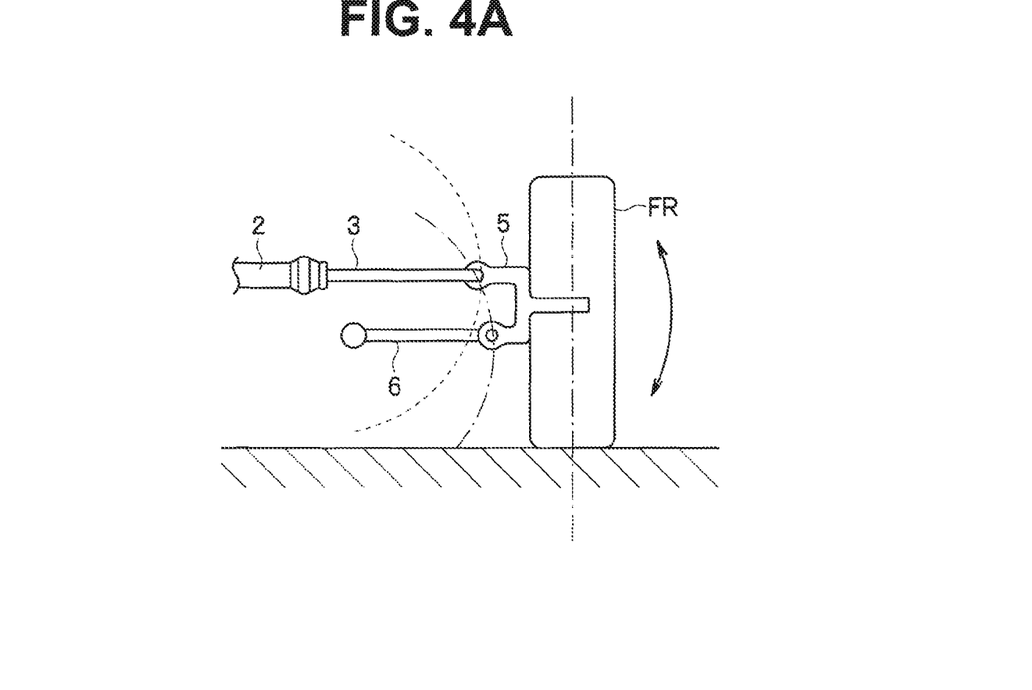
FIG. 4A is a rear view of a steering mechanism on a right-front wheel side.
Figure 4B:
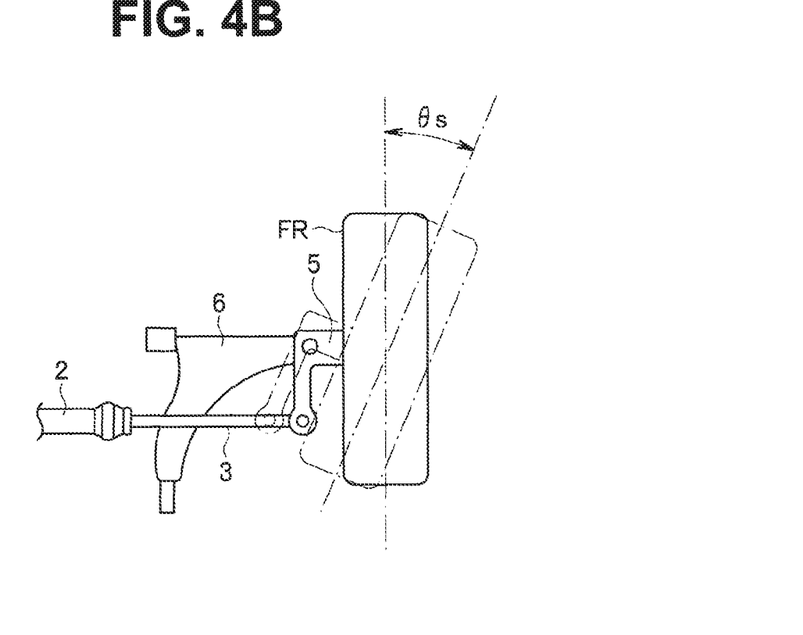
FIG. 4B is a plan view of a steering mechanism on the right-front wheel side.

That is, as illustrated in FIG. 4, the steering mechanism for turning a steered wheel (indicating the front right wheel FR in the figure) is configured so that a lower arm 6 and tie rod 3 that extend from a vehicle body frame are pivotally supported at a predetermined interval on the inner side in the vehicle width direction of a knuckle arm 5 that supports the steered wheel.

The bump steer indicates a change in the toe angle θs of the steered wheel according to the movement of the suspension link at the time of suspension bump stroke. The change in the toe angle θs appears as the steering angle of a driving wheel.

For instance, if a suspension stroke occurs when the steered wheel is trying to go over a curb, the knuckle arm 5 oscillates and the locus of the knuckle arm is determined by the oscillation locus of the lower arm 6 and the oscillation locus of a tie rod outer end which is determined by the length of the tie rod 3 and the up-down oscillation of a supporting point on the vehicle body side. In this case, as illustrated in FIG. 4A, the locus of the lower arm 6 indicated by an alternate long and short dash line and the oscillation locus of the tie rod outer end indicated by a dashed line are different from each other and therefore, the suspension geometry determined by the lower arm 6 and the tie rod outer end causes a toe angle θs to be generated at a driving wheel as illustrated in FIG. 4B.

The above-mentioned DSS_ECU 11 first detects the change amount of the steering angle of the steered wheel and when the steering angle is influenced by a disturbance, sets a PID constant of the feedback control system to a higher value so as to suppress the change in the steering angle, thereby suppressing a wobble. On the other hand, when detecting the change amount of a yaw rate though the steering angle is not significantly changed, the DSS_ECU 11 determines that bump steer occurs and actively corrects the steering angle so as to suppress a wobble.

Figure 2:
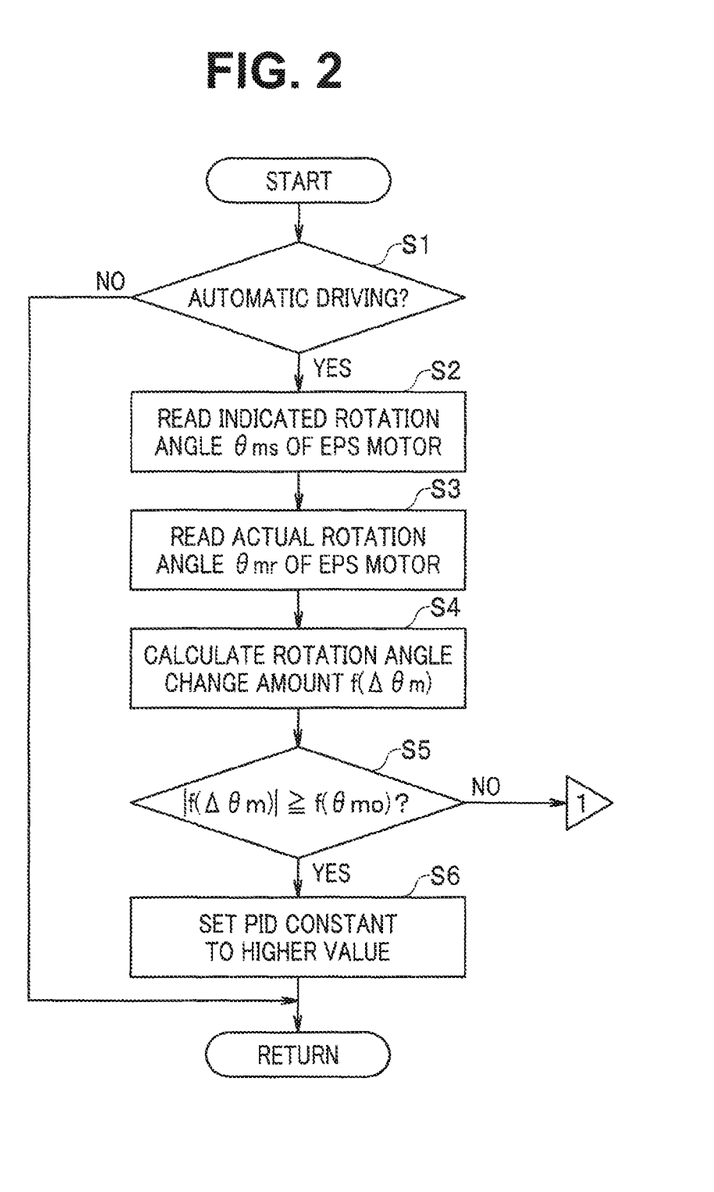
FIG. 2 is a flowchart illustrating wobble suppression processing routine (part 1)
Figure 3:
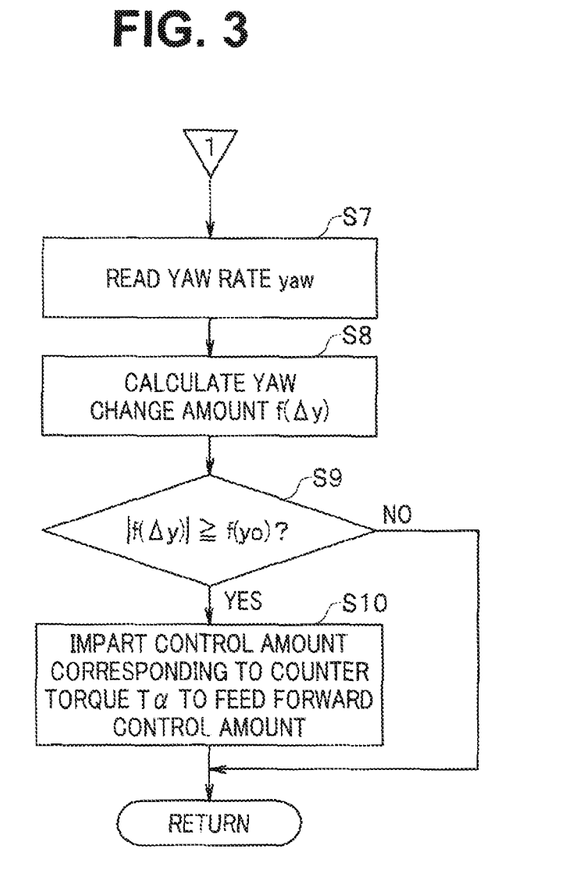
FIG. 3 is a flowchart illustrating a wobble suppression processing routine (part 2)

The wobble suppression processing in the DSS_ECU 11 is executed according to a wobble suppression processing routine illustrated in FIG. 2 and FIG. 3.

In the routine, first at step S1, it is determined whether the automatic driving is in an active state or in an inactive state, based on the state of the automatic driving switch 15. If the automatic driving switch 15 is OFF indicating the inactive state of the automatic driving, the process exits from the routine without doing anything. Accordingly, in this case, current control for assisting the steering wheel operation of a driver is performed in the EPS_ECU 9.

On the other hand, if the automatic driving switch 15 is ON indicating the active state (under automatic driving), the process proceeds to step S2. When the process proceeds to step S2, the indicated rotation angle θms for the EPS motor 8, which is set by the EPS_ECU9, is read, and at the subsequent step S3, the actual rotation angle θmr which is detected by the rotation angle sensor 12 is read.

In this example, the steering angle change of the front left and right wheels FL and FR is detected based on the actual rotation angle θmr of the EPS motor 8 detected by the rotation angle sensor 12. The steering angle change can also be determined by the steering angle detected by a steering angle sensor (not illustrated), however, the steering angle sensor is provided on the steering shaft 4 on the side of the steering wheel 4a in many cases. On the other hand, the rotation angle sensor 12 detects the rotation angle of the EPS motor 8 and therefore, is provided at a position closer to the front left and right wheels (steered wheels) FL and FR, on the steering shaft 4. Therefore, the steering angle change which acts on the front left and right wheels FL and FR can be detected with higher accuracy and better responsiveness.

Then, the indicated rotation angle θms for the EPS motor 8 and the actual rotation angle θmr detected by the rotation angle sensor 12 are compared, thereby allowing a very small change in the steering angle of the front left and right wheels FL and FR due to a disturbance to be detected with high accuracy.

In this example, the steering angle change amount of the front left and right wheels (steered wheels) FL and FR is detected from the rotation angle change amount detected by the rotation angle sensor 12 and therefore, the rotation angle sensor 12 may be either one of an absolute angle sensor and a relative angle sensor.

Next, the process proceeds to step S4, in which a difference Δθm between the indicated rotation angle θms and the actual rotation angle θmr is determined (Δθm←θmr−θms) and the rotation angle change amount f(Δθm) that is the change amount of the difference Δθm is calculated. The rotation angle change amount f(Δθm) is for detecting a steering angle change which acts on the front left and right wheels (steered wheels) FL and FR due to a disturbance, and corresponds to the above-described steering angle change amount. Accordingly, the processing in the step S4 corresponds to a steering angle change amount detector of the technology. Note that the rotation angle change amount f(Δθm) may be an angular acceleration obtained by time-differentiating the difference Δθm twice, the change rate of the difference Δθm for a fixed time period, or the like, but not limited thereto, as long as the steering angle change amount of the front left and right wheels FL and FR, which is generated due to a disturbance, can be detected.

Then, the process proceeds to step S5, in which the absolute value |f(←θm)| of the rotation angle change amount f(Δθm) and a disturbance determination threshold value f(θmo) are compared with each other, to determine whether there is a disturbance. The step S5 and the step S9 described later correspond to a disturbance determinator of the technology.

When the DSS_ECU 11 sets the center between the left and right partition lines as a target traveling route in the automatic steering control including automatic driving to make the own vehicle M travel along this target traveling route, no significant difference is generated between the indicated rotation angle θms for the EPS motor 8 and the actual rotation angle θmr obtained by detecting the actual angle of rotation. Therefore, as indicated by the solid line in FIG. 5, the rotation angle change amount f(Δθm) of the EPS motor 8, which is set for making the own vehicle travel along the target traveling route, falls within a predetermined allowable steering angle change range ±f(θmo).

Figure 5:
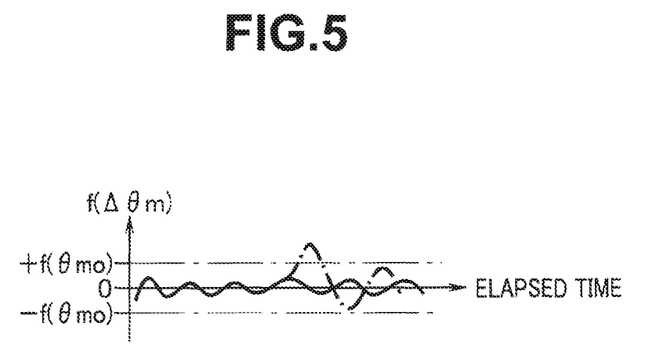
FIG. 5 is a timing chart illustrating the state in which the rotation angle of an EPS motor is significantly changed due to the influence of a disturbance.

On the other hand, when the own vehicle M receives a disturbance such as a rut, cross wind, or the like, reverse driving force is applied from the front left and right wheels (steered wheels) to the EPS motor 8 via the steering mechanism 2 and steering shaft 4. As a result, the actual rotation angle θms which is detected by the rotation angle sensor 12 for detecting the rotation angle of the EPS motor 8 largely fluctuates and therefore, as indicated by the alternate long and short dash line, the rotation angle change amount f(Δθm) of the EPS motor 8 is temporarily increased (or decreased). The disturbance determination threshold value f(θmo) is set for each vehicle model through simulation, etc., in advance.

When |f(Δθm)|≥f(θmo), it is determined that the own vehicle M is influenced by a disturbance. Then, the process proceeds to step S6 in which the PID constant that is a control gain of the feedback control system in steering control is set to a higher value, and exits the routine. The control gain having a higher value (PID constant that is set to a higher value) may be a fixed value, or may be a variable value that is set based on the rotation angle change amount f(Δθm). The processing in the step S6 corresponds to a control gain setting unit of the technology.

The EPS_ECU 9 reads the PID constant which is set to a higher value in the wobble suppression processing routine and multiplies the p-component, I-component, and D-component of the feedback control system, which are obtained in the automatic steering control, by the PID constant (P-gain, I-gain, D-gain) which is set to a higher value, thereby setting the feedback control amount. Since the PID constant for the feedback control amount is set to a higher value than usual, the feedback control amount serves as control against a disturbance, thereby allowing high responsiveness to be obtained.

Then, the feed forward control amount which is set according to the driving state of the own vehicle M is corrected with the feedback control amount to determine the indicated rotation angle θms of the EPS motor 8 which is a target control amount. The EPS_ECU 9 performs a steering control by driving the EPS motor 8 with a control amount corresponding to the indicated rotation angle θms which is set in the DSS_ECU 11.

As described above, when a disturbance is detected, the feedback control amount is set to a value that allows high responsiveness against a disturbance to be obtained and the value, which is high, is continued until |f(Δθm)|<f(θmo) is determined at step S5. As a result, the occurrence of the wobbling of the own vehicle M can be surely suppressed. At step S5, the presence or absence of a disturbance may be estimated by using, for instance, a disturbance observer which is provided in the feedback control system, based on both the indicated rotation angle θms that is an input value to the EPS motor 8 and the actual rotation angle θmr that is an output value.

On the other hand, if |f(Δθm)|<f(θmo) at step S5, that is, if it is determined that a steering system is not influenced by a disturbance, the process branches to step S7. At step S7, a yaw rate "yaw" detected by the yaw rate sensor 13 is read, and at step S8, the yaw change amount f(Δy) is calculated based on the yaw rate "yaw." Accordingly, the processing in the step S8 corresponds to a vehicle behavior detector of the technology.

Figure 6:
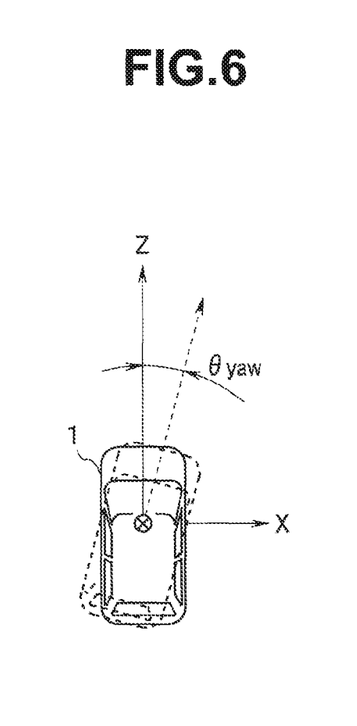
FIG. 6 is a plan view of the vehicle in a state where a yaw angle is generated under the influence of a disturbance.

The yaw change amount f(Δy) may an angular acceleration obtained by time-differentiating the yaw rate "yaw," the change rate of the yaw rate "yaw" for a fixed time period, or the like, but not limited thereto, as long as the change amount of the yaw angle θyaw (see FIG. 6) that acts on the own vehicle M can be detected. Note that in FIG. 6, the X-axis indicates a vehicle width direction and the Z-axis indicates a traveling direction.

After that, the process proceeds to step S9, in which the absolute value |f(Δy)| of the yaw change amount f(Δy) and a bump determination threshold value f(yo) are compared with each other to determine whether there is a disturbance due to bump steer. The bump determination threshold value f(yo) is a value for determining whether the yaw rate "yaw" that is generated in the own vehicle M has been detected based on a change in the toe angle θs due to bump steer. The bump determination threshold value f(yo) is set for each vehicle model through simulation, etc., in advance.

As described above, the suspension stroke at the time when the steered wheel of the own vehicle M goes over an undulation such as a step difference causes bump steer in which the toe angle θs (see FIG. 4B) is changed. As a result, even if $|f(\Delta\theta m)|<f(\theta mo)$ is determined at step S5, the toe angle θs appears as a steering angle and therefore, yaw is generated in the own vehicle M. The toe angle θs changes according to the suspension stroke and therefore, as indicated by the alternate long and short dash line in FIG. 7, when bump steer occurs in going over an undulation, the yaw change amount $f(\Delta y)$ largely fluctuates and a wobble becomes more likely to occur.

At step S9, the absolute value $|f(\Delta y)|$ of the yaw change amount $f(\Delta y)$ and the bump determination threshold value $f(yo)$ are compared with each other, to check whether bump steer has occurred.

Figure 7:
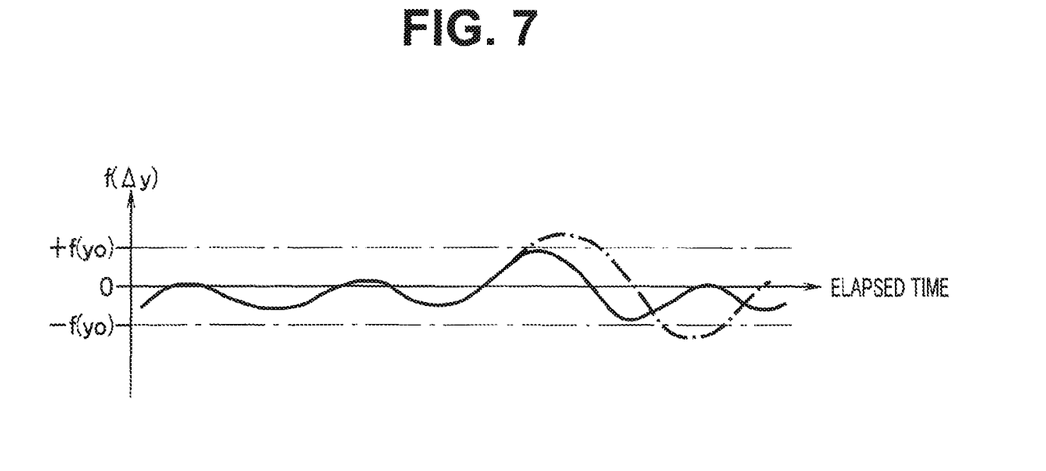
FIG. 7 is a timing chart illustrating a yaw change that acts on the vehicle.

Then, if $|f(\Delta y)|<f(yo)$, that is, if the yaw change amount $f(\Delta y)$ falls within the allowable yaw change range $\pm f(yo)$, as indicated by the solid line in FIG. 7, the process exits the routine without doing anything and continues a normal automatic steering control.

On the other hand, if $|f(\Delta y)|\geq f(yo)$, that is, if the yaw change amount $f(\Delta y)$ is outside the allowable yaw change range $\pm f(yo)$, the process proceeds to step S10. At step S10, it is determined that a wobble is likely to occur due to bump steer, the control amount corresponding to the predetermined counter torque Tα is applied (added) on the feed forward control amount corresponding to the basic rotation angle of the EPS motor 8, and the process exits the routine.

The counter torque Tα is a fixed value set in advance for cancelling the change amount of the toe angle θs generated due to bump steer. This counter torque Tα is a very small value and immediately after the state of $|f(\Delta y)|\geq f(yo)$ is detected, the control amount corresponding to the counter torque Tα is added to the feed forward control amount for each operation period. Accordingly, the processing in the step S10 corresponds to a counter torque applying processor of the technology.

Figure 8:
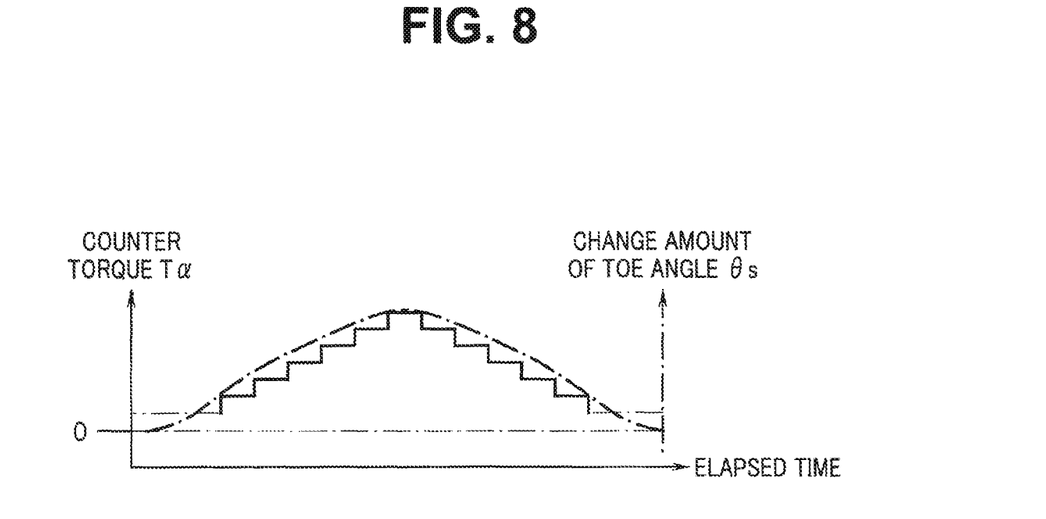
FIG. 8 is a timing chart illustrating a relationship between the change in a toe angle due to bump steer and a counter torque.

As illustrated in FIG. 8, the control amount corresponding to the counter torque Tα is added to the feed forward control amount for each operation period and thereby, to the change amount of the toe angle θs that geometrically follows the change in the suspension stroke, a steering angle for cancelling the change amount is added. As a result, even when the toe angle θs is changed due to bump steer, the steering angle of the front left and right wheels FL and FR is not significantly changed. This prevents a wobble from occurring when the own vehicle M passes over an undulation such as a step difference during traveling by the automatic steering control, thereby allowing a favorable traveling performance to be obtained.

The technology is not limited to the above example. For instance, in a case where a gain for setting a PID constant to a higher value is a fixed value in processing at step S6 illustrated in FIG. 2, it may be possible that a PID constant having a higher value is stored in advance in preparation for a disturbance and when a disturbance is detected, the PID constant having a higher value is applied by switching from a normal PID constant.

Thus, according to the technology, during traveling by automatic steering control, when it is determined that the steering angle change amount is within the allowable steering angle change range and the yaw change amount is outside the allowable yaw change range, the counter torque for suppressing the yaw change is applied on the power steering motor. This suppresses the wobble of the own vehicle even in a situation where a yaw change easily occurs due to bump steer (toe angle change), thereby allowing a favorable traveling performance to be obtained.

Each of the automatic steering control device 1 and traveling environment recognition device 21 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the automatic steering control device 1 including EPS_ECU 9, DSS_ECU 11, and Locator_ECU 17, and the traveling environment recognition device 21 (see FIG. 1). Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the modules shown in FIG. 1.

Although some embodiments of the technology have been described in the foregoing by way of example with reference to the accompanying drawings, the technology is by no means limited to the embodiments s described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. An automatic steering control device for a vehicle including an electric power steering motor, the automatic steering control device comprising:
    a rotation angle sensor configured to detect a rotation angle of the electric power steering motor;
    a yaw rate sensor configured to detect a yaw rate of the vehicle;
    a controller configured to control the rotation angle based on a motor control amount for driving the electric power steering motor;
    a steering angle change amount detector configured to detect a steering angle change amount that is a change amount of a difference between the motor control amount and the rotation angle;
    a disturbance determinator configured determine an occurrence of a bump steer based on the steering angle change amount and a yaw change amount, the yaw change amount is a change amount of the yaw rate; and
    a counter torque applying processor configured to apply a counter torque for cancelling a change amount of a toe angle generated due to the bump steer on the electric power steering motor, when the disturbance determinator detect the occurrence of the bump steer.

2. The automatic steering control device according to claim 1, further comprising:
    a control gain setting unit configured to set, when the disturbance determinator determines that the steering angle change amount is outside an allowable steering angle change range, a control gain of a feedback control system for the electric power steering motor to a higher value so as to suppress the steering angle change amount.

3. The automatic steering control device according to claim 1, wherein the disturbance determinator is configured determine that the bump steer has occurred when an absolute value of the steering angle change amount is less than a first predetermined value and an absolute value of the yaw change amount is greater or equal to a second predetermined value.

4. The automatic steering control device according to claim 3, further comprising:
 a traveling environment recognition device configured to obtain a road shape in front of the vehicle; and
 a control unit configured to calculate the motor control amount for making the vehicle travel along the road shape.

5. The automatic steering control device according to claim 1, further comprising:
 a traveling environment recognition device configured to obtain a road shape in front of the vehicle; and
 a control unit configured to calculate the motor control amount for making the vehicle travel along the road shape.

6. An automatic steering control device for a vehicle including an electric power steering motor, the automatic steering control device comprising:
 a rotation angle sensor configured to detect a rotation angle of the electric power steering motor;
 a yaw rate sensor configured to detect a yaw rate of the vehicle;
 circuitry configured to control the rotation angle based on a motor control amount for driving the electric power steering motor;
 circuitry configured to detect a steering angle change amount that is a change amount of a difference between the motor control amount and the rotation angle;
 circuitry configured to determine an occurrence of a bump steer based on the steering angle change amount and a yaw change amount, the yaw change amount is a change amount of the yaw rate; and
 circuitry configured to apply, when the disturbance determinator detect the occurrence of the bump steer, a counter torque for cancelling a change amount of the toe angle generated due to the bump steer on the electric power steering motor.

* * * * *